United States Patent
Kim et al.

(10) Patent No.: US 9,591,727 B2
(45) Date of Patent: Mar. 7, 2017

(54) LIGHTING SYSTEM AND METHOD OF CONTROLLING THE SAME

(71) Applicant: LG INNOTEK CO., LTD., Seoul (KR)

(72) Inventors: Dae Hun Kim, Seoul (KR); Sin Young Jung, Seoul (KR); Jong Heon Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 147 days.

(21) Appl. No.: 14/324,654

(22) Filed: Jul. 7, 2014

(65) Prior Publication Data
US 2015/0008845 A1    Jan. 8, 2015

(30) Foreign Application Priority Data
Jul. 4, 2013 (KR) .................. 10-2013-0078497

(51) Int. Cl.
*H05B 33/08* (2006.01)
*H05B 37/02* (2006.01)
(Continued)

(52) U.S. Cl.
CPC ....... *H05B 37/0272* (2013.01); *G06F 3/0482* (2013.01); *G06F 3/0488* (2013.01); *G06F 3/04817* (2013.01); *G06F 3/04847* (2013.01); *H05B 33/0845* (2013.01); *F21V 5/04* (2013.01); *F21V 29/70* (2015.01); *G06F 2203/04803* (2013.01)

(58) Field of Classification Search
CPC ................. H05B 33/0845; H05B 37/0272
USPC ........................................ 315/292
See application file for complete search history.

(56) References Cited

U.S. PATENT DOCUMENTS 9,075,788 B1 *   7/2015  Roth ................... G06F 11/3006
2004/0160199 A1 * 8/2004  Morgan ................. A01M 1/04
                                                         315/312
(Continued)

FOREIGN PATENT DOCUMENTS

EP         1480497 A2      11/2004
KR         101111731     *  1/2012
(Continued)

OTHER PUBLICATIONS

European Search Report dated Jan. 7, 2016 in European Application No. 14175364.0.

*Primary Examiner* — Don Le
(74) *Attorney, Agent, or Firm* — Saliwanchik, Lloyd & Eisenschenk

(57) ABSTRACT

A lighting system according to the embodiment includes a lighting device; and a graphic user interface displayed on a touch screen of a lighting control device to control the lighting device. The graphic user interface includes a first region to display a map for an installation space of the lighting device and a lighting icon corresponding to the lighting device in the map; and a second region to display a menu for setting a control condition of the lighting device corresponding to the lighting icon. The map includes a plurality of division spaces obtained by dividing the installation space into a plurality of regions and the lighting icon is displayed in a specific division space corresponding to an actual installation portion of the lighting device.

17 Claims, 26 Drawing Sheets

(51) Int. Cl.
  *G06F 3/0481*  (2013.01)
  *G06F 3/0482*  (2013.01)
  *G06F 3/0484*  (2013.01)
  *G06F 3/0488*  (2013.01)
  *F21V 29/70*  (2015.01)
  *F21V 5/04*  (2006.01)

(56) References Cited

U.S. PATENT DOCUMENTS

| | | | |
|---|---|---|---|
| 2008/0072175 A1* | 3/2008 | Corbett | G06F 3/048 |
| | | | 715/810 |
| 2011/0112691 A1 | 5/2011 | Engelen | |
| 2011/0254792 A1* | 10/2011 | Waters | G06F 1/1626 |
| | | | 345/173 |
| 2012/0153868 A1* | 6/2012 | Gu | H05B 37/0227 |
| | | | 315/307 |
| 2012/0261166 A1 | 10/2012 | Oh et al. | |
| 2012/0306621 A1 | 12/2012 | Muthu | |
| 2015/0261379 A1* | 9/2015 | Kneuper | G08G 5/0008 |
| | | | 345/173 |
| 2015/0351204 A1* | 12/2015 | Hershberg | H05B 37/0272 |
| | | | 315/153 |

FOREIGN PATENT DOCUMENTS

| KR | 101111731 B1 | 3/2012 |
|---|---|---|
| KR | 10-2012-0126821 A | 11/2012 |
| KR | 10-2013-0050440 A | 5/2013 |

\* cited by examiner

LIGHTING SYSTEM AND METHOD OF CONTROLLING THE SAME

CROSS-REFERENCE TO RELATED APPLICATION

This application claims the benefit under 35 U.S.C. §119 of Korean Patent Application No. 10-2013-0078497 filed Jul. 4, 2013, which is hereby incorporated by reference in its entirety.

BACKGROUND

Technical Field

The embodiment relates to a lighting system. More particularly, the embodiment relates to a lighting system which can control the operational state of a plurality of lighting devices in real time by using a lighting control device, such as a terminal, and a method of controlling the same.

In general, in order to control the operational state (on state, off state and dimming state) of a lighting device, a user needs to manually manipulate a switch connected to the lighting device through a cable.

However, the patient, the senior citizen or the infirm who cannot move freely, or children who cannot reach the switch may feel inconvenience when controlling the lighting device using the switch.

Meanwhile, an incandescent lamp or a fluorescent lamp is mainly used as the lighting device. However, the incandescent lamp or the fluorescent lamp causes great power consumption under the same lighting efficiency and has a short life cycle. In particular, mercury may be flown out when the fluorescent lamp is discarded, causing the serious problem of environmental pollution.

For this reason, recently, a lighting device, which uses an environmental-friendly LED having low power consumption and semi-permanent life span as a light source, has been spotlighted.

Especially, the LED has advantages of easily controlling the degree of illumination and adjusting color tones as well as the above advantages.

However, only is the on-off control possible for the lighting device according to the related art by using a remote controller or a cable switch.

For this reason, the lighting device according to the related art causes waste of energy. In addition, the degree of illumination based on use environment cannot be controlled and the operational states of a plurality of lighting devices cannot be recognized from the outside.

BRIEF SUMMARY

The embodiments provide a lighting system capable of checking and changing the operational state of a plurality of lighting devices in real time by using an application installed in a lighting control device, such as a terminal, and a method of controlling the same.

Technical objects of the embodiment may not be limited to the above object and other technical objects of the embodiment will be apparent to those skilled in the art from the following description.

A lighting system according to the embodiment may include a lighting device; and a graphic user interface displayed on a touch screen of a lighting control device to control the lighting device, wherein the graphic user interface may include a first region to display a map for an installation space of the lighting device and a lighting icon corresponding to the lighting device in the map; and a second region to display a menu for setting a control condition of the lighting device corresponding to the lighting icon, and wherein the map may include a plurality of division spaces obtained by dividing the installation space into a plurality of regions and the lighting icon may be displayed in a specific division space corresponding to an actual installation portion of the lighting device.

The lighting icon may include a first type lighting icon to represent the lighting device under on-state; and a second type lighting icon to represent the lighting device under off-state.

The lighting icon may further include a third type lighting icon to represent the lighting device under off-state of communication linkage to the lighting control device.

When a first type specific lighting icon is first-selected from among lighting icons displayed in the first region, the first-selected first type specific icon may be changed into a second type lighting icon, and when a second type specific lighting icon is first-selected from among the lighting icons displayed in the first region, the first-selected second type specific icon may be changed into the first lighting icon.

The graphic user interface may further include a third region to display a menu for changing an operation state of the lighting device corresponding to a second-selected lighting icon as a specific lighting icon is second-selected from among lighting icons displayed in the first region, and wherein the menu displayed in the third region may include a first menu to change a state of a power source of the lighting device corresponding to the second-selected lighting icon; and a second menu to change a brightness of the lighting device corresponding to the second-selected lighting icon.

The menu displayed in the third region may further include a third menu to select a group control, the graphic user interface may further display a group selection menu to select one specific group from among a plurality of groups as the third menu is selected, and the group control may be used to collectively control a plurality of lighting devices which are grouped as one same group.

The menu displayed in the second region may include at least one of a load menu to select a type of the map displayed in the first region, an auto-control menu to automatically control the lighting device according to a distance between the lighting device and the lighting control device, a group menu to collect a plurality of lighting icons corresponding to a plurality of lighting device as one group, a general menu to set a display type of an icon displayed in the graphic user interface and a help menu to display a help.

The menu displayed in the second region may include a registration menu to register unregistered lighting devices from among lighting devices located around the lighting control device.

The lighting control device may search for the unregistered lighting devices from among the lighting devices located around the lighting control device when the registration menu is selected, and a candidate icon may be displayed in the graphic user interface to register the unregistered lighting devices according to a search result of the lighting control device.

The candidate icon may be shifted to a specific division space of a plurality of division spaces displayed in the first region, which corresponds to an actual installation position of a corresponding lighting device, according to selection of a user, and the lighting device corresponding to a selected candidate icon may perform a register dimming operation as the candidate icon is selected.

Meanwhile, a method of controlling a lighting device according to the embodiment may include executing an application to control the lighting device; displaying a graphic user interface on a touch screen of a lighting control device as the application is executed; and controlling the lighting device by using the displayed graphic user interface, wherein the graphic user interface may include a first region to display a map for an installation space of the lighting device and a lighting icon corresponding to the lighting device in the map; and a second region to display a menu for setting a control condition of the lighting device corresponding to the lighting icon, and wherein the map may include a plurality of division spaces obtained by dividing the installation space into a plurality of regions and the lighting icon is displayed in a specific division space corresponding to an actual installation portion of the lighting device.

The lighting icon may include a first type lighting icon to represent the lighting device under on-state; and a second type lighting icon to represent the lighting device under off-state.

The lighting icon may further include a third type lighting icon to represent the lighting device under off-state of communication linkage to the lighting control device.

When a first type specific lighting icon is first-selected from among lighting icons displayed in the first region, the first-selected first type specific icon may be changed into a second type lighting icon, and when a second type specific lighting icon is first-selected from among the lighting icons displayed in the first region, the first-selected second type specific icon may be changed into the first lighting icon.

The graphic user interface may further include a third region to display a menu for changing an operation state of the lighting device corresponding to a second-selected lighting icon as a specific lighting icon is second-selected from among lighting icons displayed in the first region, and wherein the menu displayed in the third region may include a first menu to change a state of a power source of the lighting device corresponding to the second-selected lighting icon; and a second menu to change a brightness of the lighting device corresponding to the second-selected lighting icon.

The menu displayed in the third region may further include a third menu to select a group control, the graphic user interface may further display a group selection menu to select one specific group from among a plurality of groups as the third menu is selected, and the group control may be used to collectively control a plurality of lighting devices which are grouped as one same group.

The menu displayed in the second region may include at least one of a load menu to select a type of the map displayed in the first region, an auto-control menu to automatically control the lighting device according to a distance between the lighting device and the lighting control device, a group menu to collect a plurality of lighting icons corresponding to a plurality of lighting device as one group, a general menu to set a display type of an icon displayed in the graphic user interface and a help menu to display a help.

The menu displayed in the second region may include a registration menu to register unregistered lighting devices from among lighting devices located around the lighting control device.

The lighting control device may search for the unregistered lighting devices from among the lighting devices located around the lighting control device when the registration menu is selected, and a candidate icon may be displayed in the graphic user interface to register the unregistered lighting devices according to a search result of the lighting control device.

The candidate icon may be shifted to a specific division space of a plurality of division spaces displayed in the first region, which corresponds to an actual installation position of a corresponding lighting device, according to selection of a user, and the lighting device corresponding to a selected candidate icon may perform a register dimming operation as the candidate icon is selected.

According to the embodiment, the operational state of a plurality of lighting devices can be checked and changed in real time by using the lighting control device, such as a terminal, pursuant to the political measures for national power consumption regulation and smart control.

In addition, according to the embodiment, the lighting device can be registered and controlled by using a wireless lighting technology, so the user's convenience can be improved.

DETAILED DESCRIPTION

The principle of the embodiments will be described below. Therefore, although not specifically described and depicted in the specification, a person having the ordinary skill in the art may realize the principle of the embodiments and may invent various apparatuses within the concept and scope of the embodiments. Further, in principle, conditional terms and embodiments mentioned in the specification shall be obviously intended to understand the concept of the embodiments and may not limit the scope of the embodiments.

Further, it shall be understood that all detailed descriptions, which teach a specific embodiment as well as a principle, an aspect and embodiments, are intended to include structural and functional equivalents. Further, it should be understood that the equivalents may include equivalents to be developed in the future as well as known equivalents and may include all devices invented for performing the same functions regardless of the structure thereof The embodiment provides a lighting system capable of wirelessly controlling a plurality of lighting devices by using a lighting control device, such as a terminal.

Hereinafter, the lighting system will be described with reference to FIGS. 1 to 3.

Figure 1:
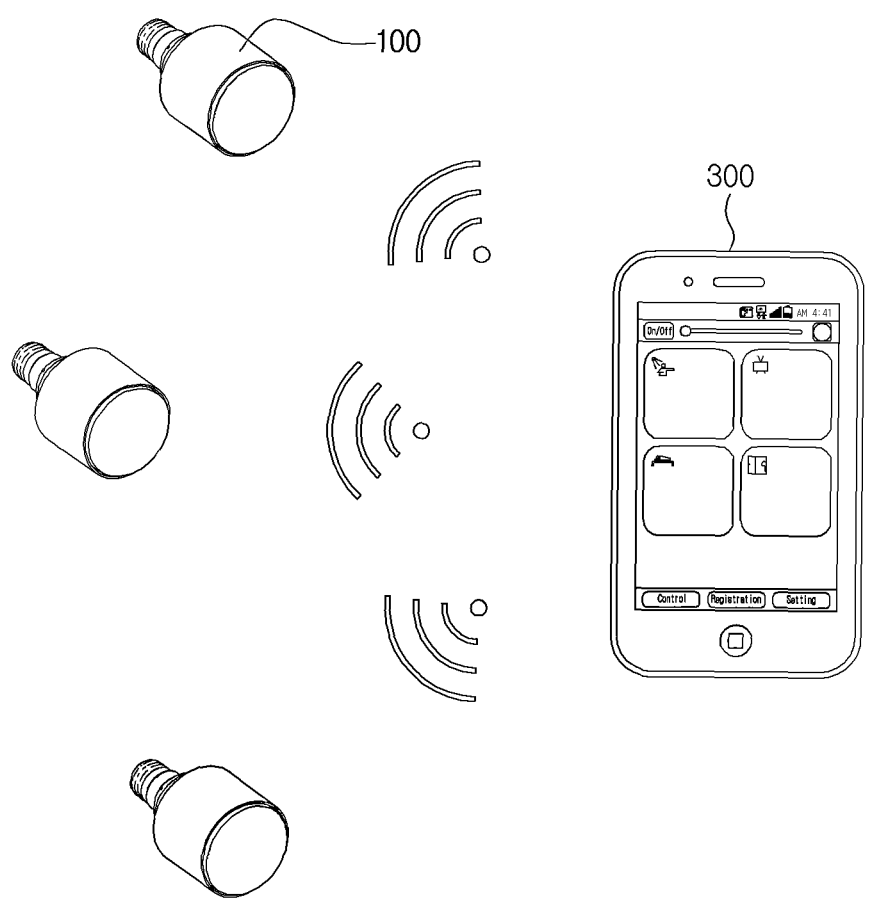
FIG. 1 is a view showing a configuration of a lighting system according to the embodiment.
Figure 2:
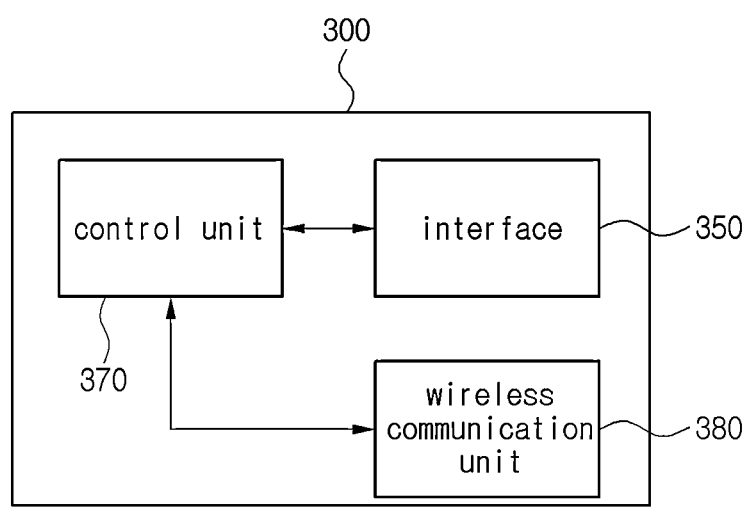
FIG. 2 is a view showing an internal configuration of a lighting control device shown in FIG. 1.
Figure 3:
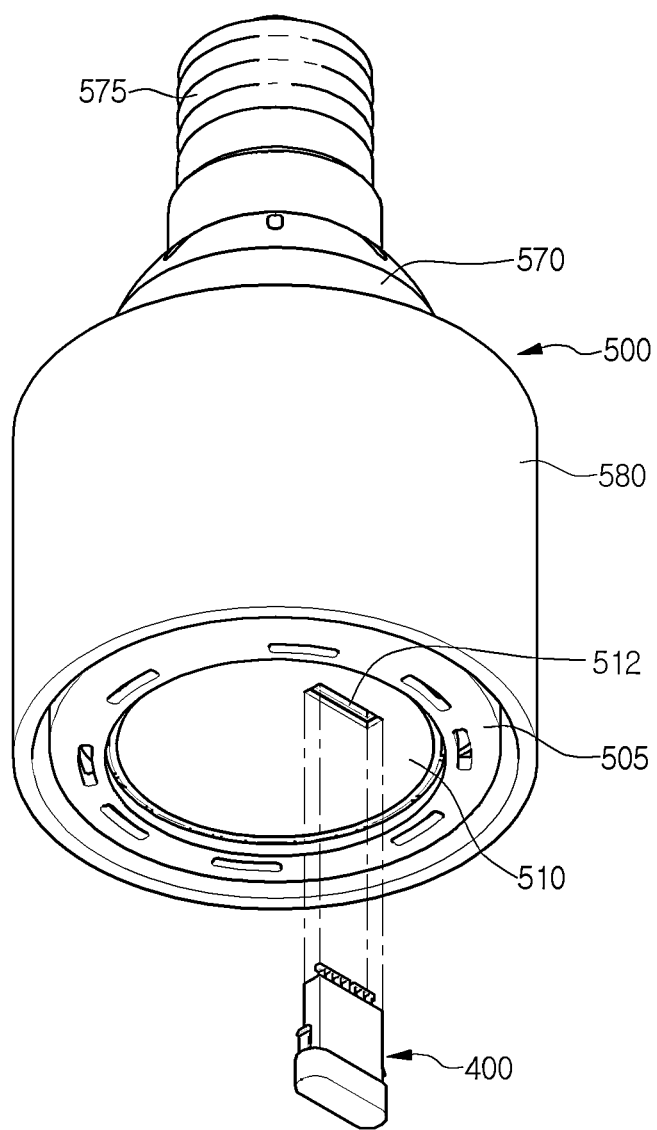
FIG. 3 is a perspective view showing a structure of a lighting device shown in FIG. 1.

FIG. 1 is a view showing a configuration of the lighting system according to the embodiment, FIG. 2 is a view showing an internal configuration of a lighting control device shown in FIG. 1 and FIG. 3 is a perspective view showing a structure of a lighting device shown in FIG. 1.

Referring to FIG. 1, the lighting system according to the embodiment includes a lighting control device 300 and lighting devices 100.

The lighting control device 300 may be connected to a plurality of lighting devices 100 through a wireless network.

The lighting control device 300 may store applications and provide a graphic user interface to control the lighting devices 100 by executing the applications.

The lighting control device 300 may be a terminal capable of storing and executing the applications. The terminal may include at least one of a mobile phone, a smart phone, a laptop computer, a digital broadcasting terminal, personal digital assistants (PDA), a portable multimedia player (PMP) and a navigation device.

However, the embodiment is not limited to the above, but the lighting control device 300 may include various devices which can install the applications therein through download and can perform the wireless communication.

The lighting devices 100 may be controlled by a dimming device, etc. At least one lighting device 100 may be provided. Preferably, a plurality of lighting devices 100 may be provided.

The lighting control device 300 may be an input unit to input a user command. The lighting control device 300 may be connected to the lighting devices 100 through a wireless network to transmit a control signal according to the user command to the lighting devices 100.

The wireless network of the lighting control device 300 may be determined according to wireless environment.

For instance, at least one of Zigbee, Bluetooth and Z-wave may be applied to the lighting control device 300 to perform the wireless communication with the lighting devices 100.

The lighting control device 300 may have a configuration as shown in FIG. 2.

Referring to FIG. 2, the lighting control device 300 may include a control unit 370, an interface 350 and a wireless communication unit 380.

The wireless communication unit 380 may be installed in a body of the lighting control device 300. In addition, a communication module (not shown) including a communication chip, which supports a corresponding wireless network, may be detachably attached to the body.

The control unit 370 may control the operation of the lighting control device 300 by using data stored in a memory.

The memory may store the management and communication control program/protocol and may store various applications therein through download.

The interface 350 may receive control signals from a user to transmit the control signals to the control unit 370 and may include a microphone, a touch screen and various local buttons.

The control unit 370 may provide image data to the interface 350 according to the program stored therein and a touch screen of the interface 350 may provide a screen to the user according to the image data.

If the user inputs a selection signal by touching the touch screen or by using various well-known schemes, the control unit 370 provides image data corresponding to the selection signal.

The lighting device 100 may have the configuration as shown in FIG. 3.

The lighting device 100 may include a lighting module 500 and a communication module 400.

The lighting module 500 may include an inner case 570 having a connecting terminal 575 at an upper portion thereof and an inserting part at a low portion thereof, a heat radiation body (not shown) into which the inserting part of the inner case 570 is inserted, a light emitting module part including a plurality of light emitting devices which emit the light to the bottom surface of the heat radiation body, a guide member 505 coupled to a lower peripheral region of the heat radiation body to allow the light emitting module part to be firmly fixed to the heat radiation body, a lens 510 formed between the guide member 505 and the light emitting module part, and an outer case 580 outside the heat radiation body.

The lens 510 may include a lens opening part 512 for receiving the communication module 400. The communication module 400 is inserted into the lens opening part 512.

The communication module 400 inserted into the lens opening part 512 may be connected to a connector of a power control unit so that the control signal transmitted through the lighting control device 300 may be transferred to the lighting module 500.

The lighting system including a plurality of lighting devices 100, which can be wirelessly controlled, may control the lighting devices 100 in real time by using the graphic user interface provided through the touch screen of the lighting control device 300 as the application is executed.

Hereinafter, the interface 350 of the lighting control device 300 will be described in more detail.

The interface 350 may include various interfaces. In the following description, the interface may signify a graphic user interface provided through the touch screen of the lighting control device 300.

Figure 4:
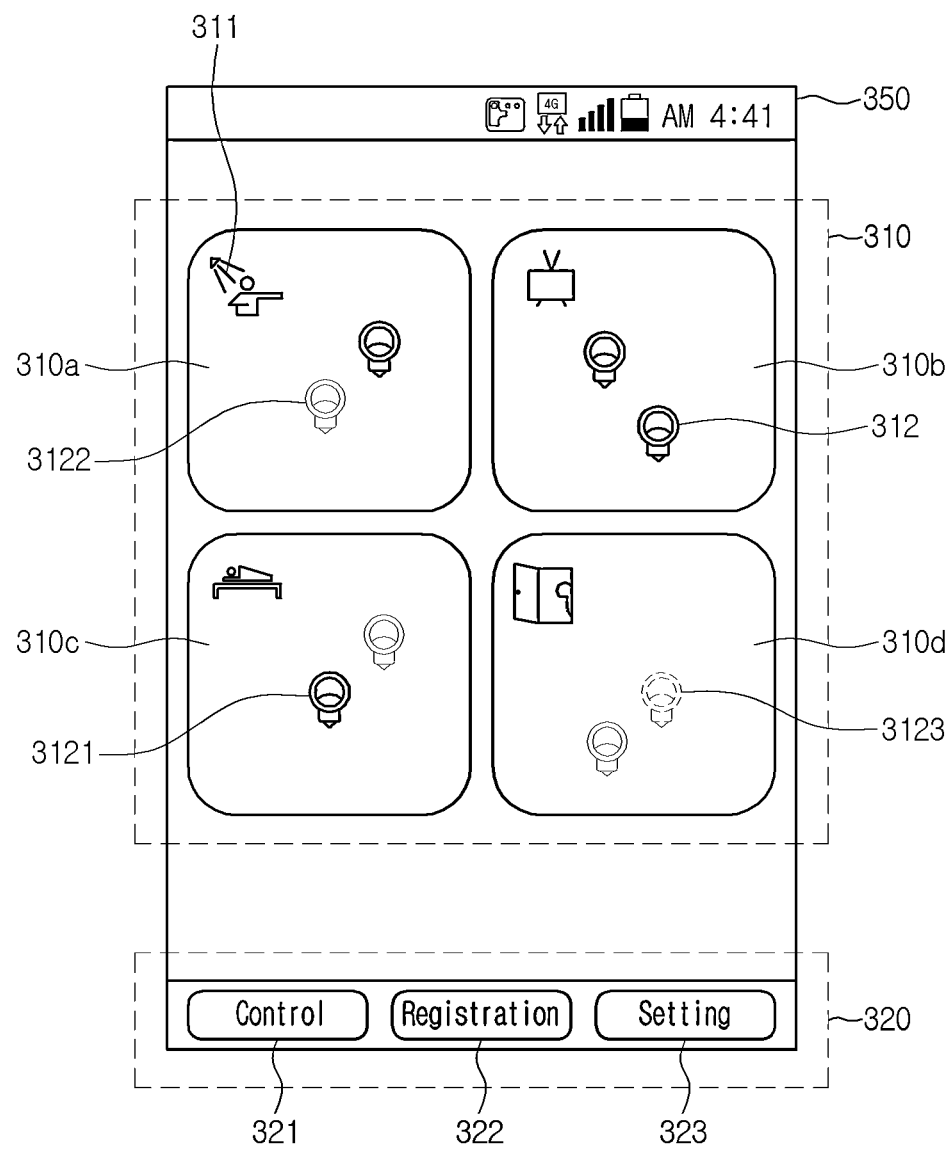
FIG. 4 is a view showing a main image of a graphic user interface provided through a touch screen of a lighting control device shown in FIG. 2.

FIG. 4 is a view showing a main image of the graphic user interface provided through the touch screen of the lighting control device 300 shown in FIG. 2. In the following description, the interface 350 will be referred to as the graphic user interface.

Referring to FIG. 4, the graphic user interface 350 may include a first region 310 and a second region 320. The graphic user interface 350 shown in FIG. 4 may be a starting screen displayed as the application (for controlling the lighting device) stored in the lighting control device 300 is executed.

A map for installation spaces of a plurality of lighting devices may be displayed at the first region 310 in a specific scheme. The map displayed at the first region 310 may be divided into a plurality of spaces. That is, in the case that the lighting devices are installed in a house, the map may be divided into a first division space 310a representing a bath room, a second division space 310b representing a living room, a third division space 310c representing a bed room and a fourth division space 310d representing an entrance.

In addition, space icons 311 may be displayed in the division spaces 310a, 310b, 310c and 310d to represent information about the place of each division space.

Further, lighting icons 312, which represent the lighting devices installed in the corresponding division space, may be displayed in the map provided at the first region 310.

In this case, the lighting icons 312 may be displayed in the division spaces 310a, 310b, 310c and 310d corresponding to the real installation position of the lighting devices. For example, if two lighting devices are installed in the first division space 310a, two lighting icons 312 corresponding to the two lighting devices may be displayed in the first division space 310a.

At this time, the displayed lighting icons 312 may have mutually different statuses based on the state of the corresponding lighting devices. The status may include an icon shape, an icon color, and an icon size. In addition, the state of the lighting device may include the operation state and the communication state.

That is, the lighting icons 312 may be displayed in different types according to the operation state and the communication state of the lighting devices.

In other words, the lighting icons 312 may include a first lighting icon having a first type, a second lighting icon having a second type, and a third lighting icon having a third type.

For example, the lighting icons 312 may include a first lighting icon 3121 representing on-state of the lighting device, a second lighting icon 3122 representing off-state of the lighting device, and a third lighting icon 3123 representing off-state of communication linkage.

A main tool bar including a plurality of menus may be displayed at the second region 320.

The main tool bar may include a menu for setting a control scheme of the lighting device, a menu for guiding the control scheme of the lighting device, a menu for selecting a display scheme of the map displayed at the first region 310, and a menu for changing a registration status of an unregistered lighting device or a registered lighting device.

In detail, the main tool bar displayed at the second region may include a control menu 321, a registration menu 322 and a setting menu 323.

The function of the control menu 321, the registration menu 322 and the setting menu 323 of the main tool bar displayed at the second region will be described later in detail.

A user may recognize the installation location and status of the lighting devices at a glance based on the map representing the installation space of the lighting devices, which is divided into a plurality of division spaces, the lighting icons representing the lighting devices actually installed in the division spaces, and the display status of the lighting icons.

Hereinafter, a method of controlling the lighting devices by using the graphic user interface will be described.

Figure 5:
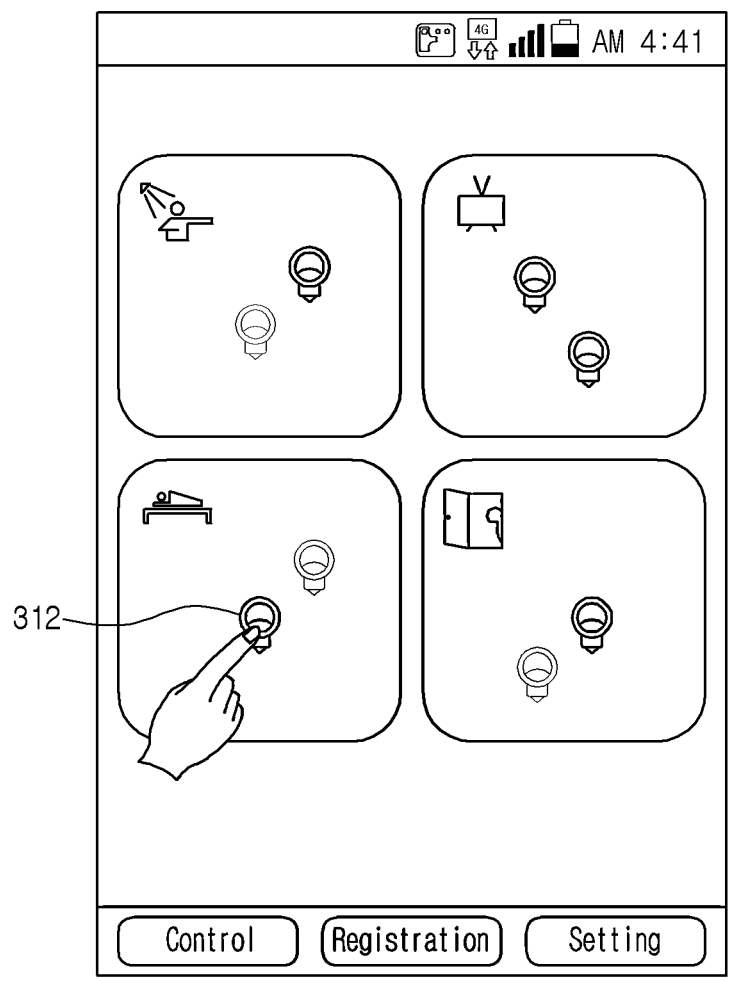
FIGS. 5 and 6 are views showing a graphic user interface for a first control of a lighting device according to the embodiment.
Figure 6:
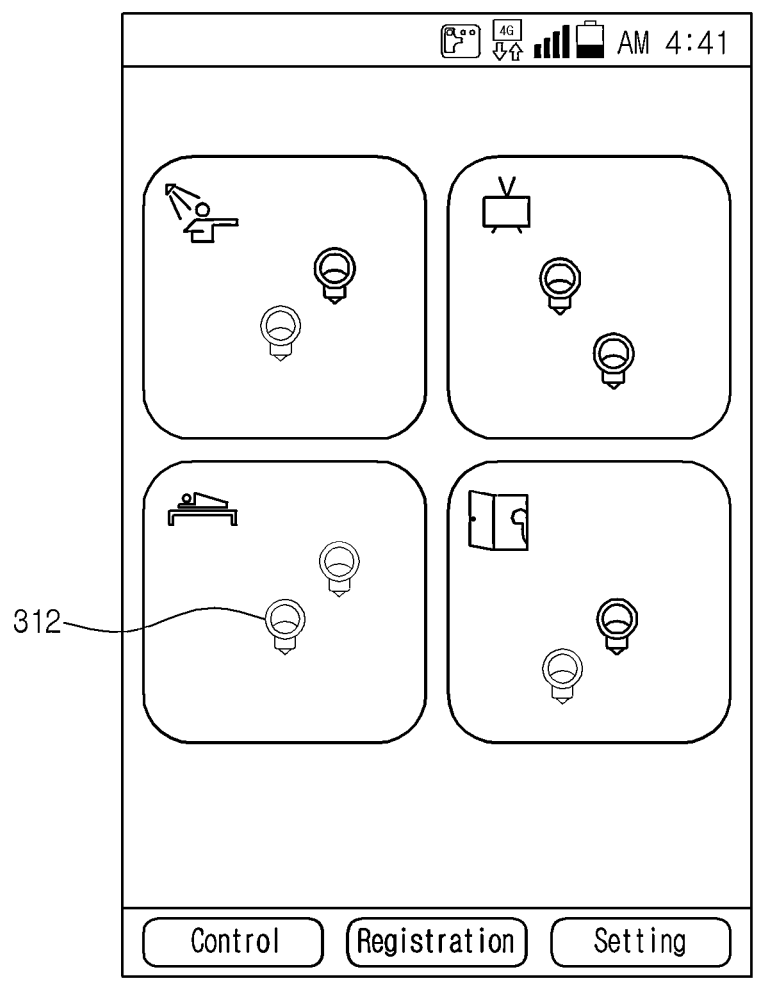

FIGS. 5 and 6 are views showing the graphic user interface for a first control of the lighting device according to the embodiment.

Referring to FIG. 5, as described above, a plurality of lighting icons corresponding to a plurality of lighting devices are displayed at the first region 310.

In this case, the user may first-select one specific lighting icon 312 from among the plural lighting icons. The first-select may refer to a short touch to a region where the specific lighting icon 312 is displayed in the touch screen of the lighting control device where the graphic user interface 350 is displayed.

As the first-select for the specific lighting icon 312 displayed at the first region 310 of the graphic user interface 350 is performed, the lighting control device 300 transmits a control signal to a specific lighting device corresponding to the specific lighting icon 312 which is first-selected.

In this case, the control signal may be changed according to the present operation state of the specific lighting device. That is, if the specific lighting device is presently on-state, the control signal may serve to change the operation state of the specific lighting device into off-state. In addition, if the specific lighting device is presently off-state, the control signal may serve to change the operation status of the specific lighting device into on-state.

Referring to FIG. 5, the specific lighting icon 312, which is first-selected, may represent the lighting device operating in on-state while making communication with the lighting control device.

Thus, the lighting control device 300 may transmit the control signal to the specific lighting device in order to change the operation state of the specific lighting device into the off-state.

As described above, when the control signal is transmitted to the specific lighting device so that the operation state of the specific lighting device is changed based on the control signal, the display status of the specific lighting icon 312 representing the specific lighting device may be changed.

That is, referring to FIG. 5, the display status of the specific lighting icon 312 may be on-state before the first-select for the specific lighting icon 312 been performed.

Then, referring to FIG. 6, the display status of the specific lighting icon 312 may be changed into off-state after the first-select for the specific lighting icon 312 has been performed.

Accordingly, the user may readily change the operation state of the specific lighting device by first-selecting the specific lighting icon from among the plural lighting icons displayed in the first region 310.

Figure 7:
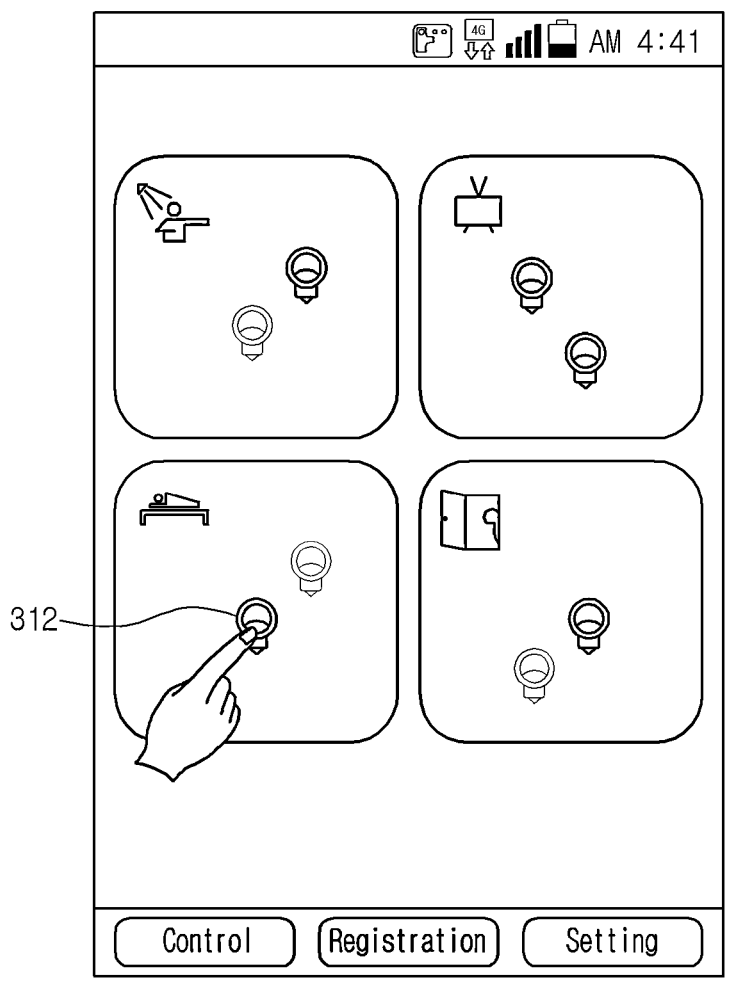
FIGS. 7 and 8 are views showing a graphic user interface for a second control of a lighting device according to the embodiment.
Figure 8:
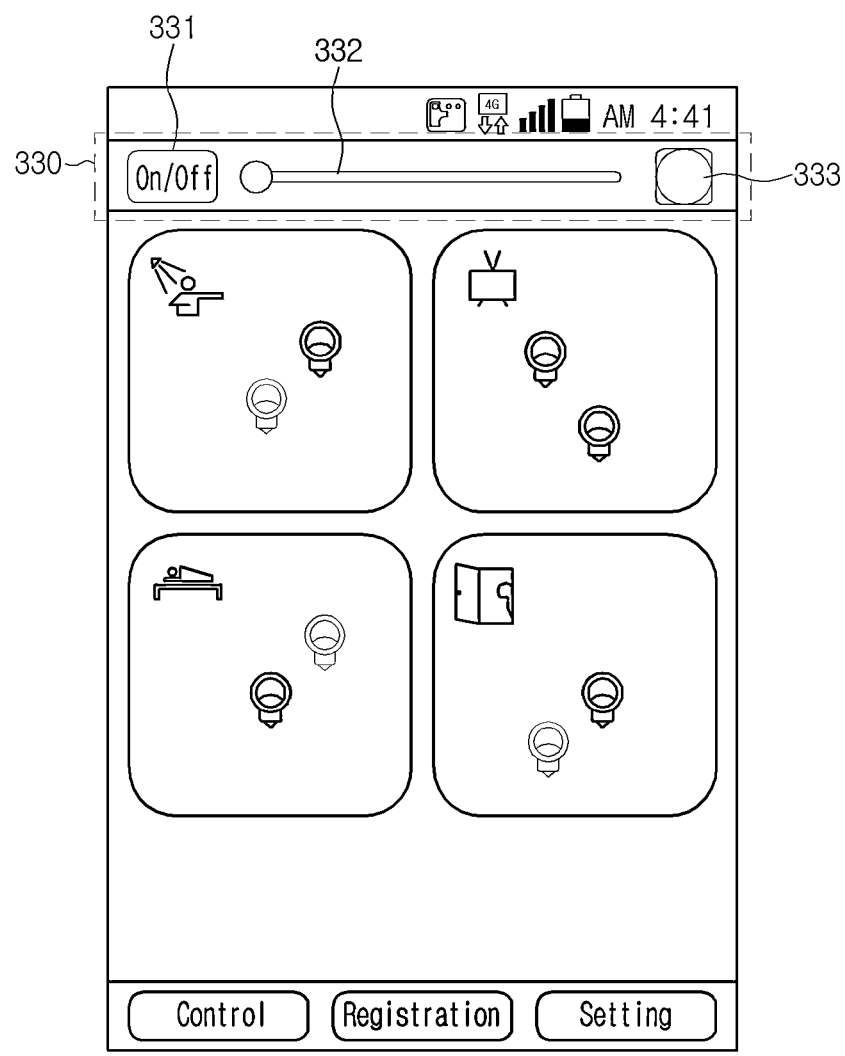

FIGS. 7 and 8 are views showing the graphic user interface for a second control of the lighting device according to the embodiment.

The above-described first control may signify a simple control for the lighting device, so the simple on-off control for the lighting device may be achieved.

However, the second control, which will be described later, may include a group control for controlling brightness or for controlling a plurality of lighting devices at a time as well as the on-off control for the lighting device.

Referring to FIG. 7, if one specific lighting icon 312 is second-selected from among the plural lighting icons displayed at the first region 310, the graphic user interface 350 may provide a screen for the second control other than the first control described above.

The second-select may be distinguished from the first-select described above. That is, the second-select may refer to a long touch to a region where the specific lighting icon 312 is displayed in the touch screen of the lighting control device where the graphic user interface 350 is displayed.

As the second-select for the specific lighting icon 312 is performed, a control tool bar for the second-control of the lighting device corresponding to the selected specific lighting icon may be displayed at a third region 330 of the user graphic interface 350.

The control tool bar displayed at the third region 330 may include a first menu 331 for turning on-off the lighting device corresponding to the specific lighting icon, a second menu 322 for controlling the brightness through the dimming control of the lighting device corresponding to the specific lighting icon, and a third menu 333 for selecting a specific group from at least one preset group.

The first menu 331 is for changing the operation state of the lighting device corresponding to the specific lighting icon 312 into on-state or off-state. Similar to the first control, the first menu 331 is used to simply change the operation state of the lighting device corresponding to the specific lighting icon 312 into on-state or off-state.

The second menu 332 is for adjusting the brightness of the lighting device corresponding to the specific lighting icon 312.

The second menu 332 may be displayed in the form of a slide in such a manner that the brightness of the specific lighting device may be lowered as a pointer included in the second menu 332 is shifted to the left and the brightness of the specific lighting device may become high as a pointer included in the second menu 332 is shifted to the right.

The third menu 333 is for selecting one specific group from at least one preset group and for collectively controlling the lighting devices included in the selected group at a time.

The lighting group control after the selection of the third menu 33 will be described later in detail.

Hereinafter, the control menu 321, the registration menu 322 and the setting menu 323 of the main tool bar displayed at the second region 320 will be described in detail.

Figure 9:
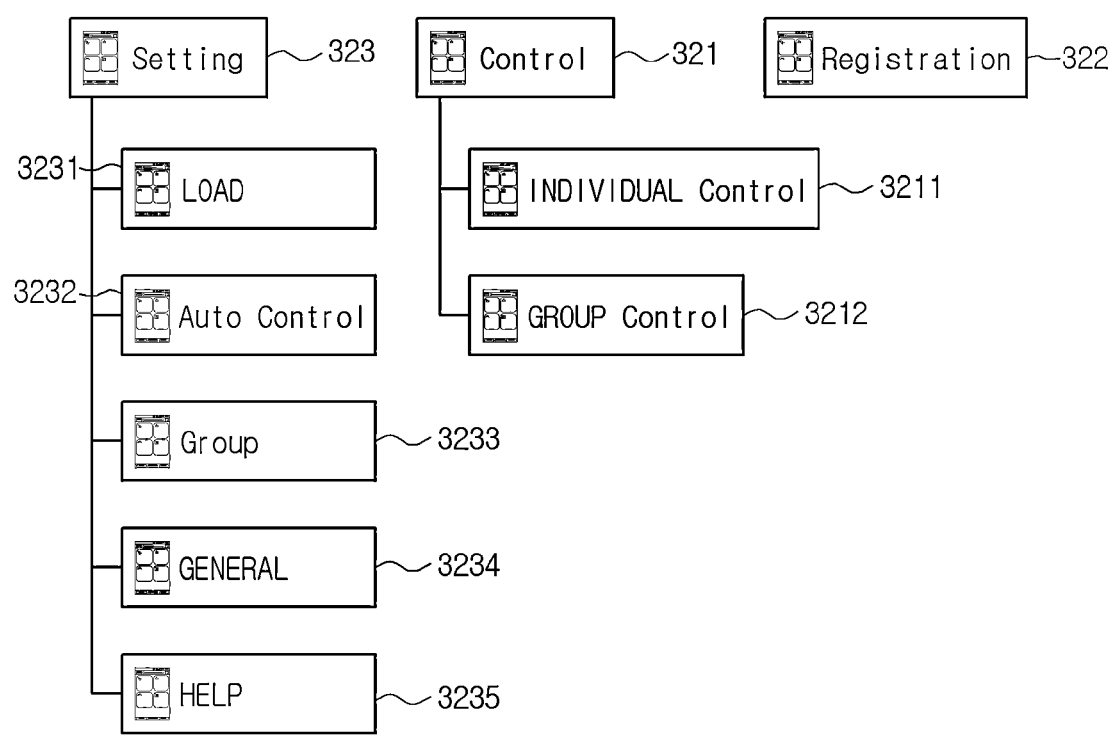
FIG. 9 is a view showing a configuration of menus displayed at a second region in a graphic user interface according to the embodiment.

FIG. 9 is a view showing a configuration of menus displayed at the second region in the graphic user interface according to the embodiment.

Referring to FIG. 9, the menu displayed at the second region 320 may include the control menu 321, the registration menu 322 and the setting menu 323.

In addition, the setting menu 323 may have a plurality of sub-menus. The sub-menus of the setting menu 323 may include a load menu 3231, an auto-control menu 3232, a group menu 3233, a general menu 3234 and a help menu 3235.

The load menu 3231 is for selecting the display scheme of the map displayed at the first region 310.

The auto-control menu 3232 is for automatically controlling the lighting devices. That is, the auto-control menu 3232 may be used to automatically set the operating condition of the lighting devices even if the user does not set the operating condition of the lighting devices.

The group menu 3233 is for setting or canceling a group with respect to the plural lighting devices in order to collectively control a plurality of lighting devices at a time.

The general menu 3234 is for setting the display status of the icons displayed in the graphic user interface 350. The display status may include the icon shape, the icon size and the icon color.

The help menu 3235 is for providing information of how to use applications for the graphic user interface, and version information of the application.

Meanwhile, the control menu 321 may include an individual control menu 3211 and a group control menu 3212.

That is, the control menu 321 is for selecting the control scheme for the lighting devices and the control scheme includes an individual control scheme for controlling one specific lighting device and a group control scheme for collectively controlling a plurality of lighting devices at a time.

In addition, the individual control menu 3211 and the group control menu 3212 are for selecting one control scheme for the lighting devices.

Hereinafter, the control menu 321, the registration menu 322 and the setting menu 323 displayed at the second region 320 will be described in more detail.

Figure 10:
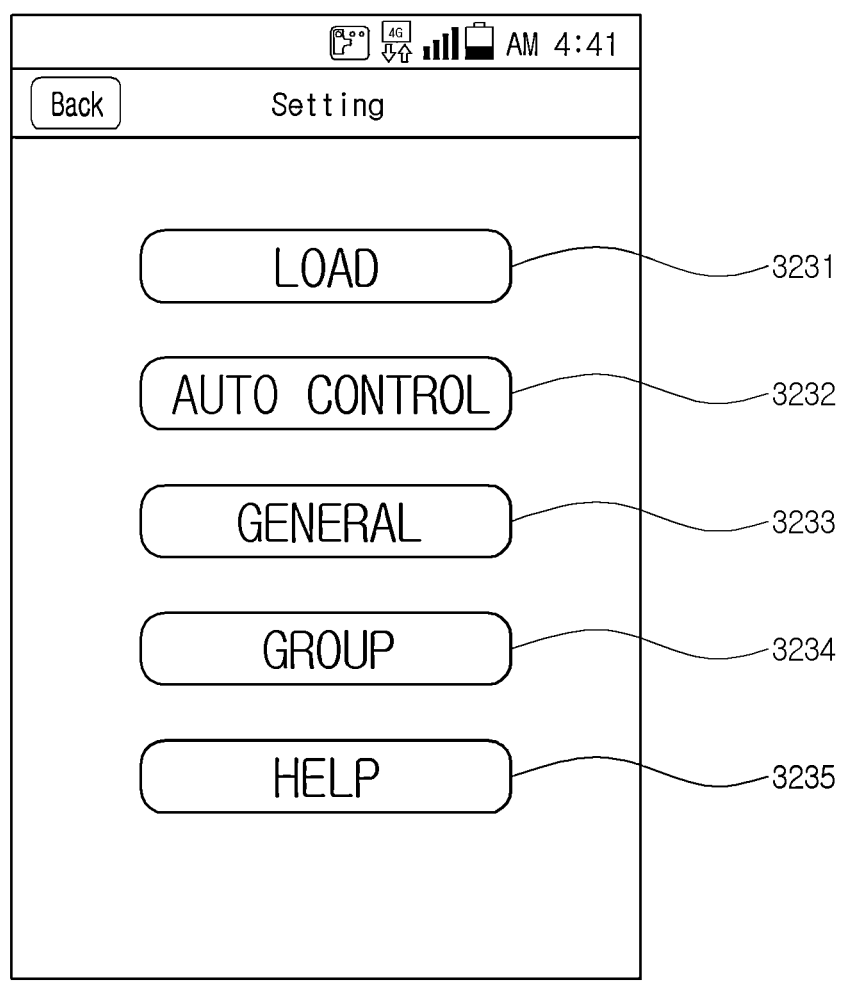
FIG. 10 is a view showing a graphic user interface displayed when a setting menu is selected according to the embodiment.

FIG. 10 is a view showing the graphic user interface displayed when the setting menu is selected according to the embodiment.

Referring to FIG. 10, if the user selects the setting menu 323 from the starting screen shown in FIG. 4, the control unit 370 may display the graphic user interface for selecting one of sub-menus.

That is, as the setting menu 323 is selected, the load menu 3231, the auto-control menu 3232, the group menu 3233, the general menu 3234 and the help menu 3235 may be displayed in the graphic user interface.

Figure 11:
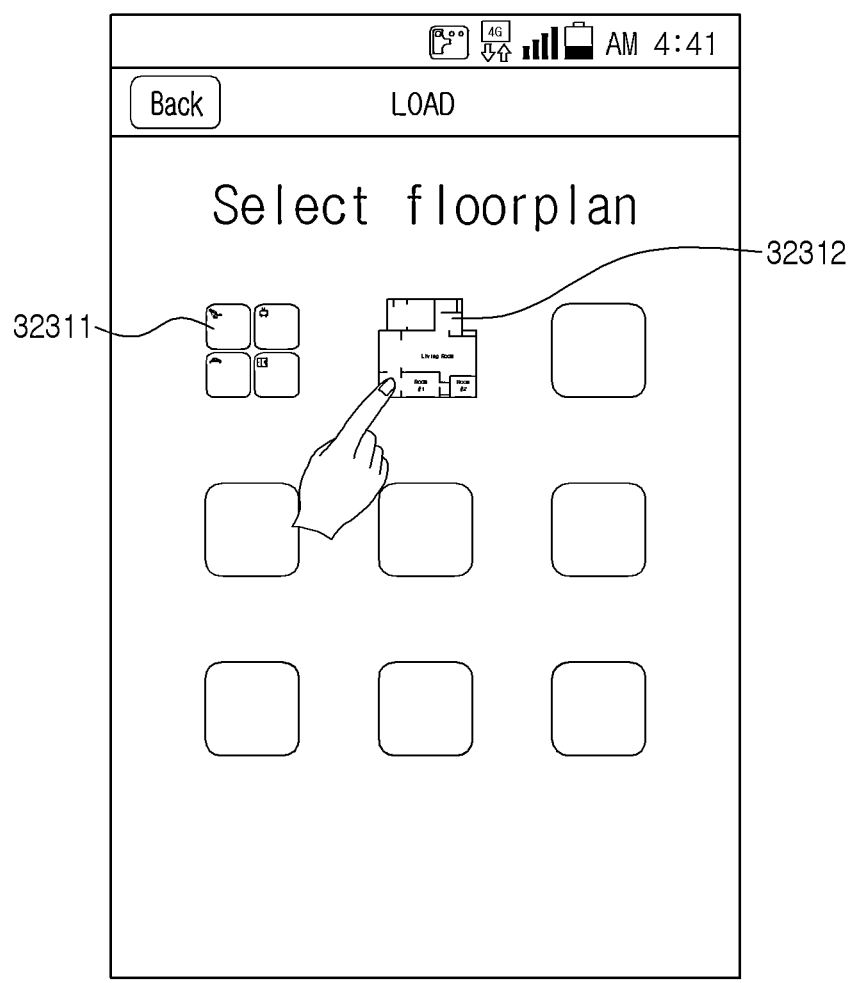
FIGS. 11 and 12 are views showing graphic user interfaces displayed when a load menu is selected according to the embodiment.
Figure 12:
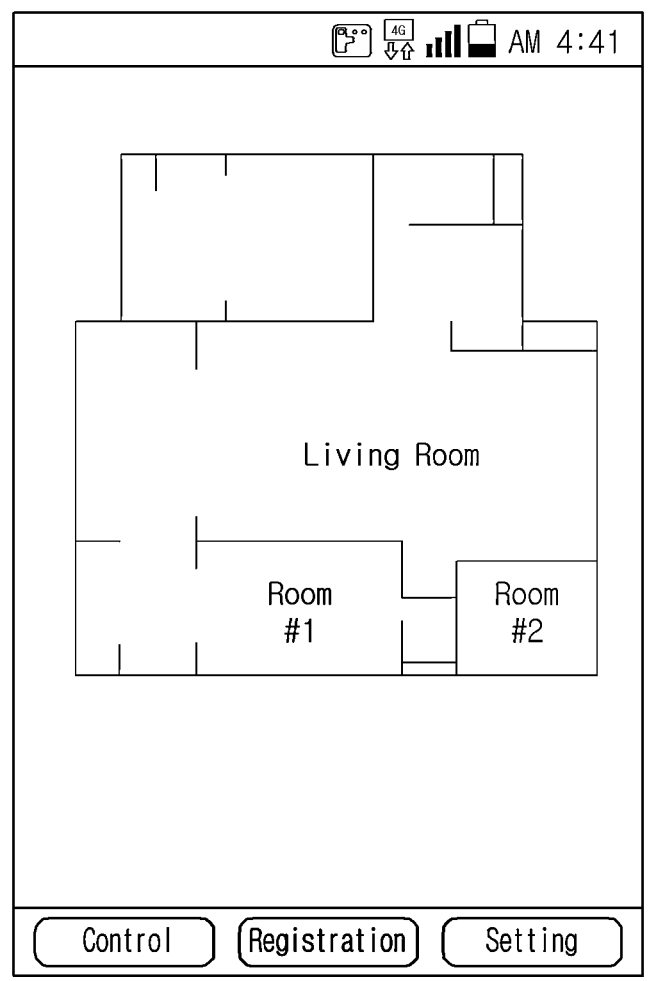

FIGS. 11 and 12 are views showing graphic user interfaces displayed when the load menu is selected according to the embodiment.

Referring to FIG. 11, if the load menu 3231 is selected from the sub-menu selection screen of the setting menu 323 as shown in FIG. 10, a screen for selecting the type of a map displayed at the first region 310 of the starting screen may be displayed.

Preview information for the type of the map may be displayed in the screen.

That is, candidate maps may be displayed in the screen to allow the user to select one of various maps.

The candidate maps may include a first candidate map 32311, which is a division space type as shown in the first region 310 of FIG. 4, and a second candidate map 32312 which is a plan-view type. The division space type may display the map in the form of a checker board to display the installation space of the lighting devices and the plan-view type may display the map in the form of an actual drawing to display the installation space of the lighting devices.

The candidate maps can be variously provided based on basic map information for installation spaces of the lighting devices by receiving the basic map information in rear time.

If one of the candidate maps is selected, a screen as shown in FIG. 12 may be displayed.

Referring to FIG. 12, if the second candidate map 32312 is selected from among the candidate maps, detailed map information for the second candidate map 32312 may be displayed.

Accordingly, the user can set the display scheme of the map for the actual space where the lighting device is installed by using the load menu 3231.

Figure 13:
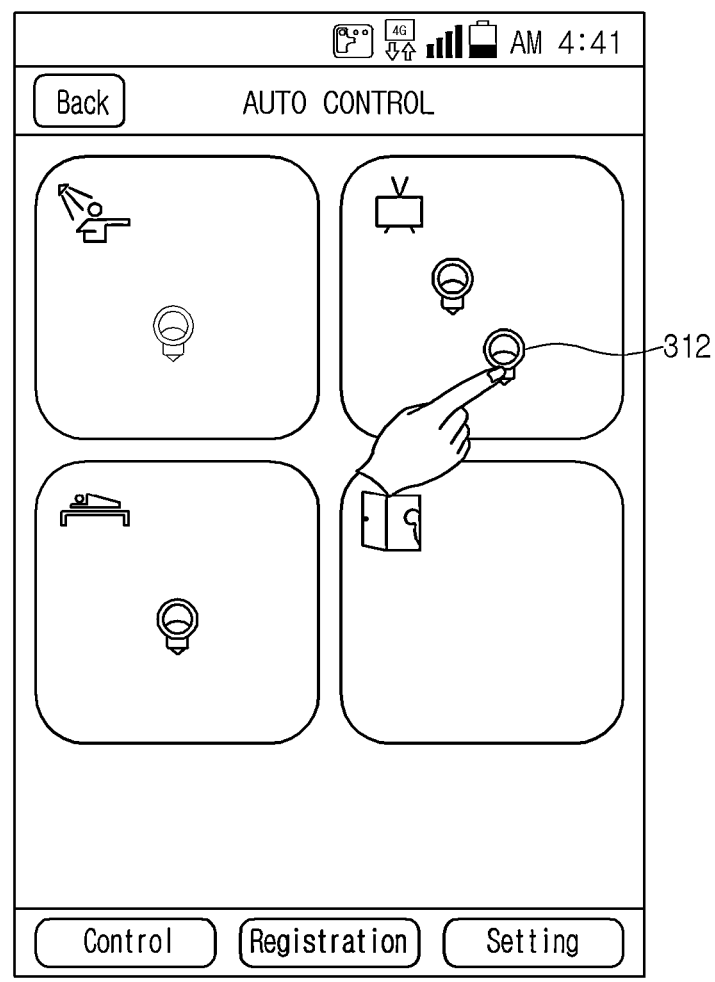
FIGS. 13 and 14 are views showing graphic user interfaces displayed when an auto control menu is selected according to the embodiment.
Figure 14:
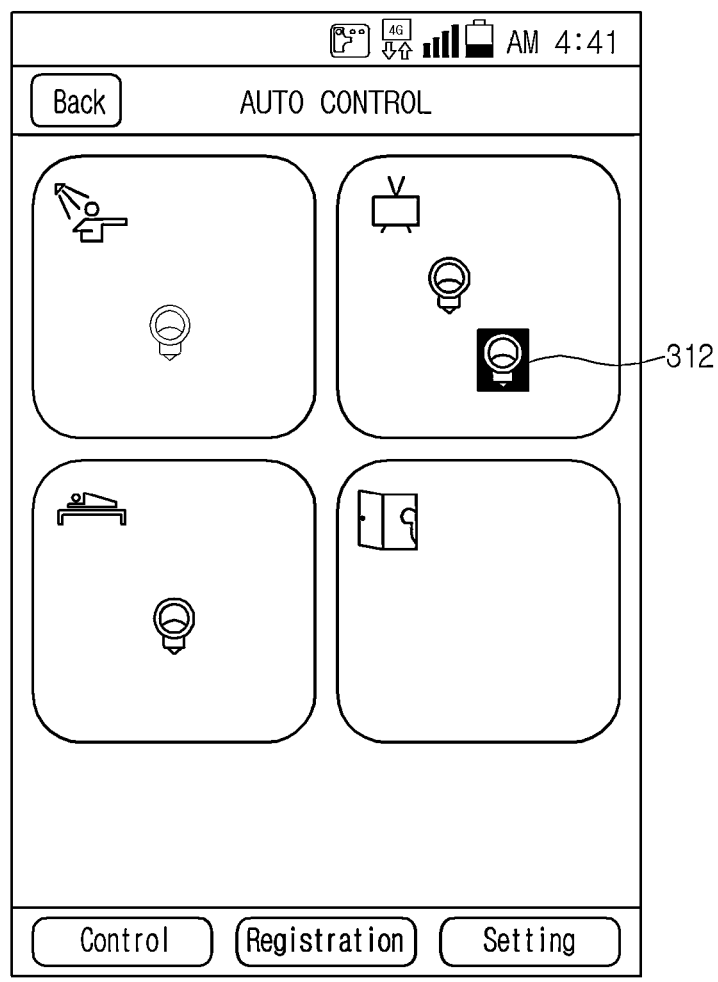

FIGS. 13 and 14 are views showing graphic user interfaces displayed when the auto control menu is selected according to the embodiment.

Referring to FIG. 13, if the auto-control menu 3232 is selected from the sub-menu selection screen of the setting menu 323 as shown in FIG. 10, a map is displayed through the first region 310 like the starting screen.

In addition, the user may select one specific lighting icon 312 for executing the auto-control function from among lighting icons included in the map. Such a selection may be performed through a short touch or a long touch to the position where the lighting icon 312 is displayed in the touch screen.

The auto-control function is for automatically adjusting the operation state of the lighting device 100 depending on the distance between the lighting device 100 and the lighting control device 300.

At this time, the distance between the lighting device 100 and the lighting control device 300 may be confirmed by a received signal strength indication (RSSI).

That is, the lighting control device 300 may transmit a signal to the lighting device 100 corresponding to the selected lighting icon 312 to confirm the distance.

In response to the signal from the lighting control device 300, the lighting device 100 may transmit a response signal to the lighting control device 300.

Upon receiving the response signal, the lighting control device 300 may confirm the RSSI based on the response signal and calculate the distance to the lighting device 100 based on the RSSI.

At this time, the selected lighting icon 312 may correspond to the lighting device installed within a predetermined distance from the position of the lighting control device 300.

Therefore, the plural lighting icons displayed at the first region 310 may be classified into selectable icons and non-selectable icons according to the distance the corresponding lighting device and the lighting control device.

In addition, the selected specific icon 312 may correspond to the lighting device installed within a predetermined distance from the present position of the lighting control device 300.

Preferably, the predetermined distance may be 3 m, but the embodiment is not limited thereto.

Meanwhile, the operation state of the lighting device subject to the auto-control function may be a brightness of the lighting device.

That is, due to the auto-control function, the brightness of the lighting device may be increased as the distance between the lighting device corresponding to the selected specific icon 312 and the lighting control device becomes reduced and the brightness of the lighting device may be lowered as the distance between the lighting device and the lighting control device becomes increased.

In addition, if the distance between the lighting device and the lighting control device deviates from the reference distance, the lighting device may be powered-off.

At this time, the brightness according to the distance may be classified as three steps of a high brightness, an intermediate brightness and a turn-off, but the embodiment is not limited thereto.

Meanwhile, the lighting icon corresponding to the lighting device where the auto-control function is executed, that is, the selected specific icon 312 may notify the execution of the auto-control function. That is, as shown in FIG. 14, the background color of the selected specific icon 312 may be changed to notify that the auto-control function is being executed for the lighting device corresponding to the selected specific icon 312.

Figure 15:
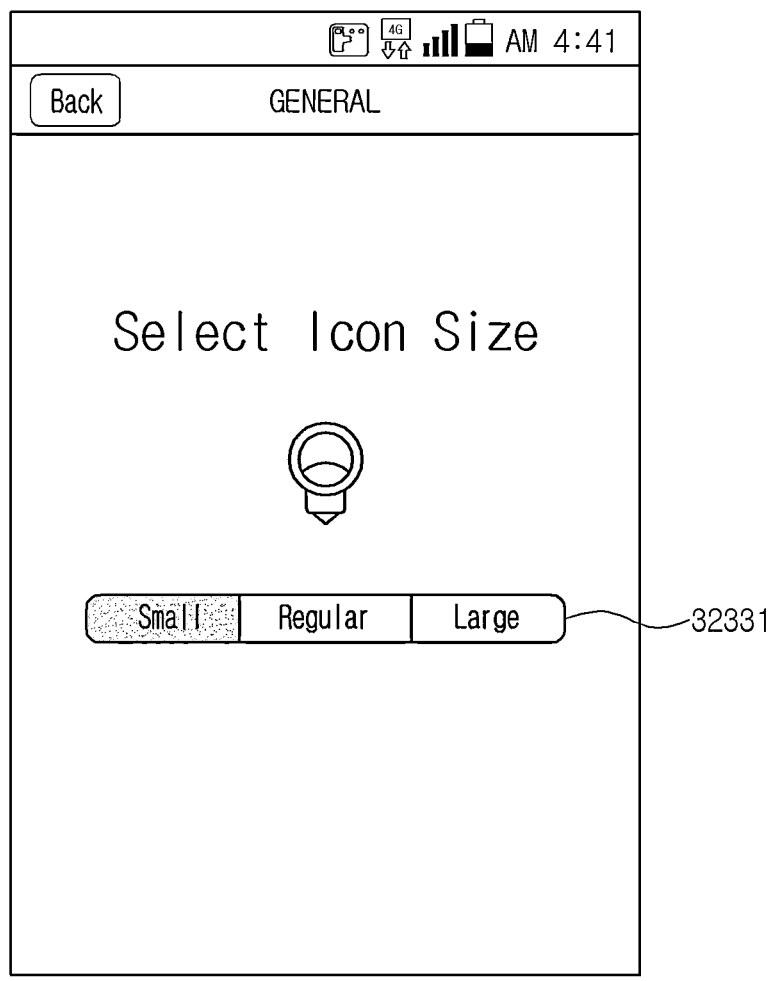
FIG. 15 is a view showing a graphic user interface displayed when a general menu is selected according to the embodiment.

FIG. 15 is a view showing the graphic user interface displayed when the general menu is selected according to the embodiment.

Referring to FIG. 15, as the general menu 3233 is selected from the sub-menu selection screen of the setting menu 323 shown in FIG. 10, a screen for setting the display type of various icons included in the graphic user interface may be displayed.

In this case, the display type may be an icon size.

Thus, a size selection menu 32331 for selecting the icon size may be displayed in the screen for setting the display type of various icons.

The size selection menu 32331 may include a small size menu, a regular size menu and a large size menu, but the embodiment is not limited thereto.

Figure 16:
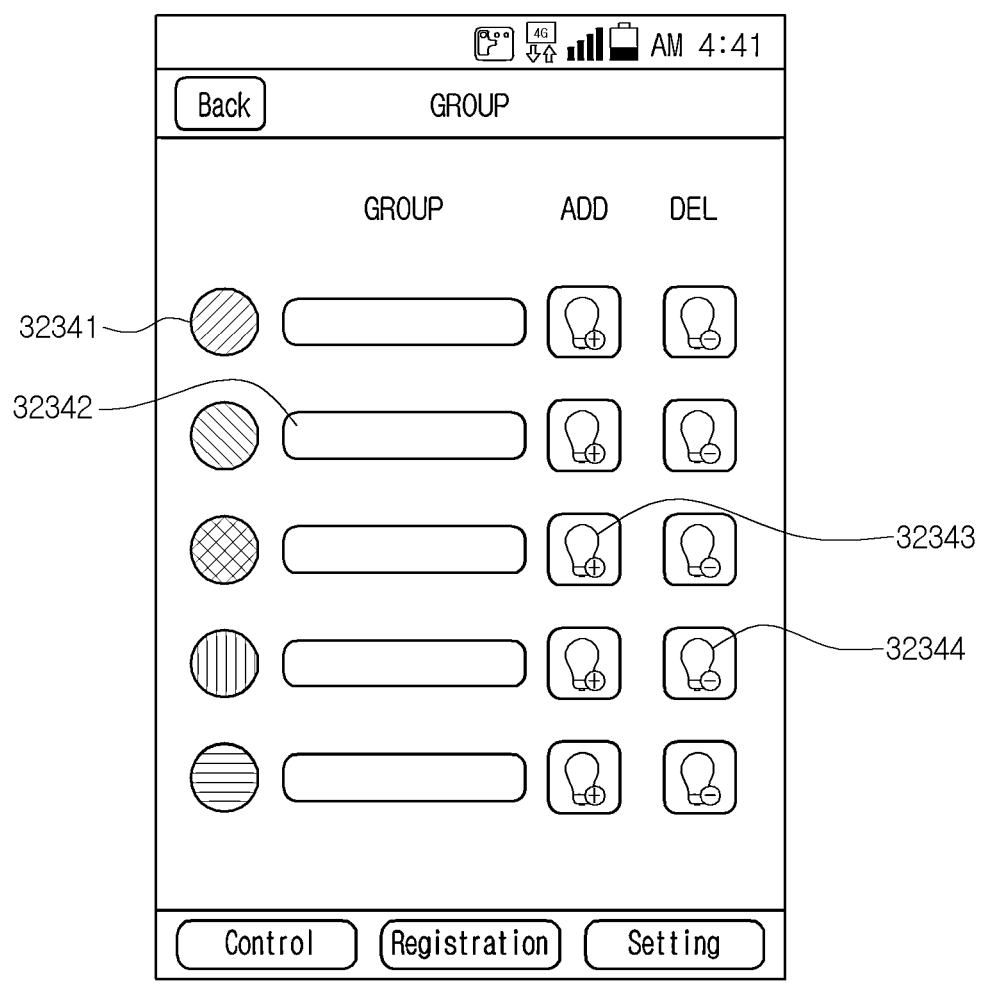
FIGS. 16 to 18 are views showing graphic user interfaces displayed when a group menu is selected according to the embodiment.
Figure 17:
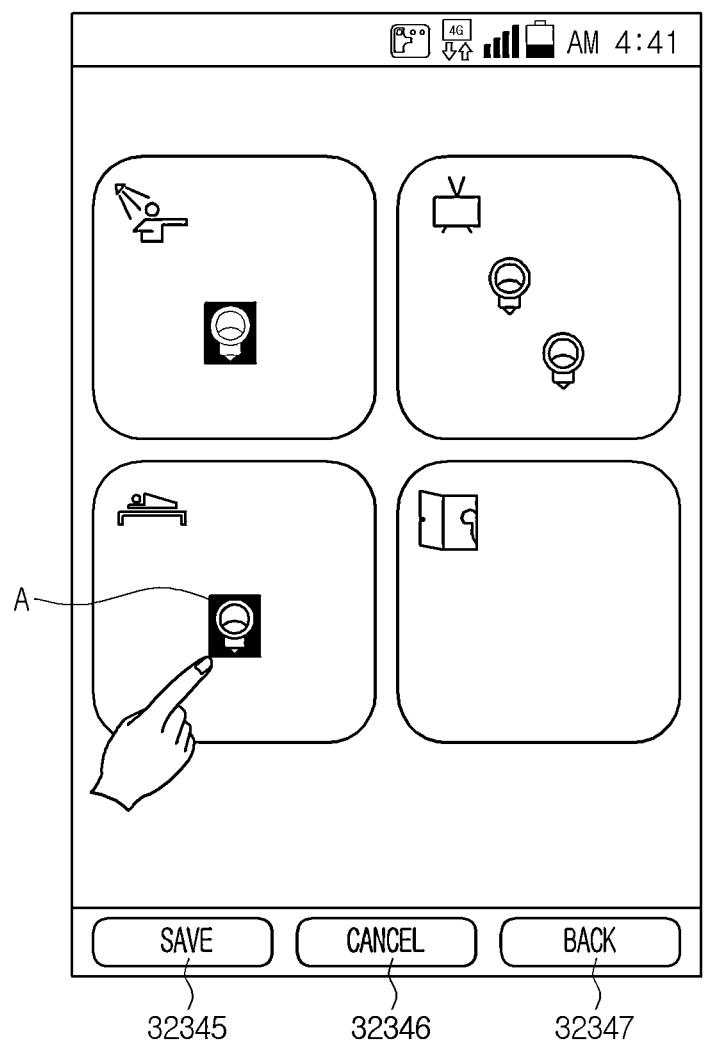
Figure 18:
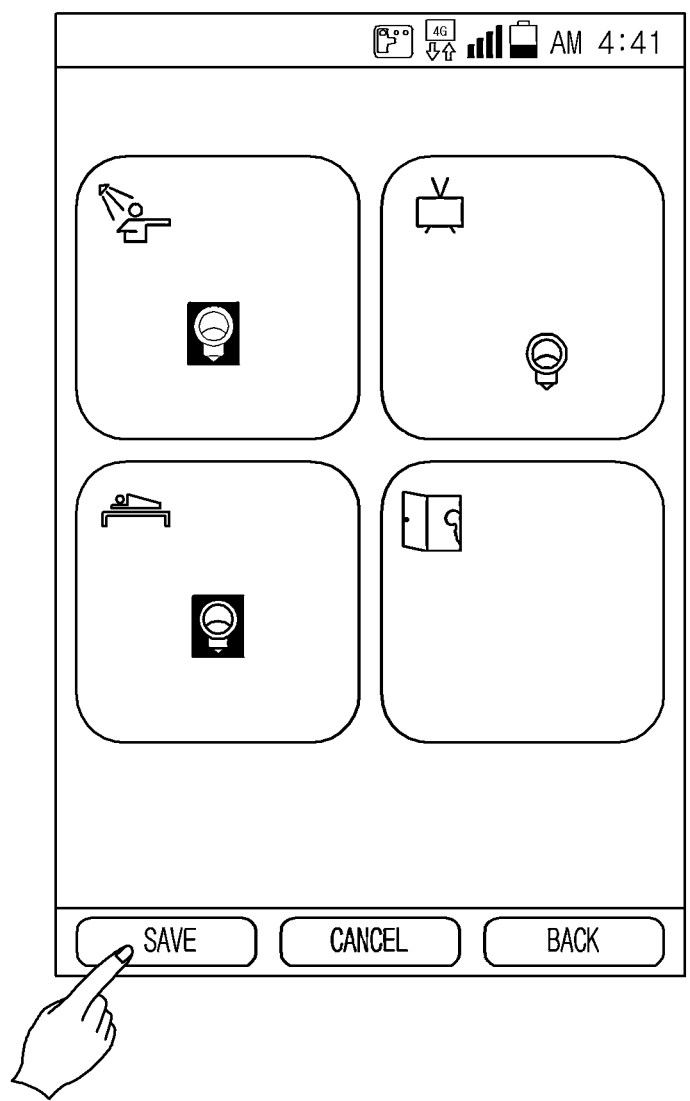

FIGS. 16 to 18 are views showing graphic user interfaces displayed when the group menu is selected according to the embodiment.

Referring to FIG. 16, as the group menu 3234 is selected from the sub-menu selection screen of the setting menu 323 shown in FIG. 10, a group setting screen for designating the group of the lighting devices and editing the designated group may be displayed.

The group setting screen may include a symbol 32341 for classifying a plurality of groups, a group name region 32342 for displaying the name of groups or inputting the name of the groups, an addition menu 32343 for adding a specific lighting device for each group, and a deletion menu 32344 for deleting the specific lighting device added to each group.

The symbol 32341 is for classifying the groups. Thus, the groups may have symbols of mutually different shapes. In FIG. 16, the symbols have mutually different hatching lines, but the embodiment is not limited thereto. For instance, the symbols may have mutually different sizes, colors and shapes to classify the groups.

If a specific symbol is selected from the group setting screen, a setting screen for the group corresponding to the selected symbol may be displayed.

In addition, if the group name region 32342 is selected from the group setting screen, it is possible to input the group name to the group name region 32342 or to correct the group name registered in the group name region 32342.

Further, if the addition menu 32343 is selected from the group setting screen, it is possible to add a specific lighting device to the corresponding group.

That is, if the addition menu 32343 for the specific group is selected, a screen for performing the lighting grouping with respect to the specific group may be displayed as shown in FIG. 17.

Referring to FIG. 17, a map including the lighting icons as described above may be displayed in a first screen of the graphic user interface.

In addition, lighting icons to be added to the specific group may be selected from among the lighting icons displayed in the map.

At this time, the selected lighting icons may be disposed in the same division space. Otherwise, the lighting icons disposed in mutually different division spaces may be designated in the same group.

Further, if at least one lighting icon is selected, the background color or pattern of the selected lighting icon may be changed in match with the color or pattern of the symbol corresponding to the specific group.

In addition, if the selected lighting icon is selected again, the selected lighting icon designated to the specific group may be canceled so that the background color or pattern of the selected lighting icon may be changed to the original background color or pattern.

Meanwhile, a save menu 32345, a cancel menu 32346, and a back menu 32347 may be displayed in the second region of the graphic user interface.

The save menu 32345 is for designating and storing the selected lighting icons to the same group.

The cancel menu 32346 is for canceling the group designation for the selected lighting icons.

The back menu 32347 is for returning to the previous menu after the group designation for the selected lighting icons is canceled.

In addition, as shown in FIG. 18, if the save menu 32345 is selected from among the above menus, the setting for the specific group may be completed.

If the group setting is completed, the lighting icons belonging to the same group from among the lighting icons of the graphic user interface shown in FIG. 4 may have the same color or pattern and the lighting icons belonging to mutually different groups may have mutually different colors or patterns.

Thus, the user, at a glance, can recognize the lighting devices designated to the same group from the starting screen.

FIGS. 19 to 24 are views for explaining a registration process of the lighting device according to the embodiment.

Figure 19:
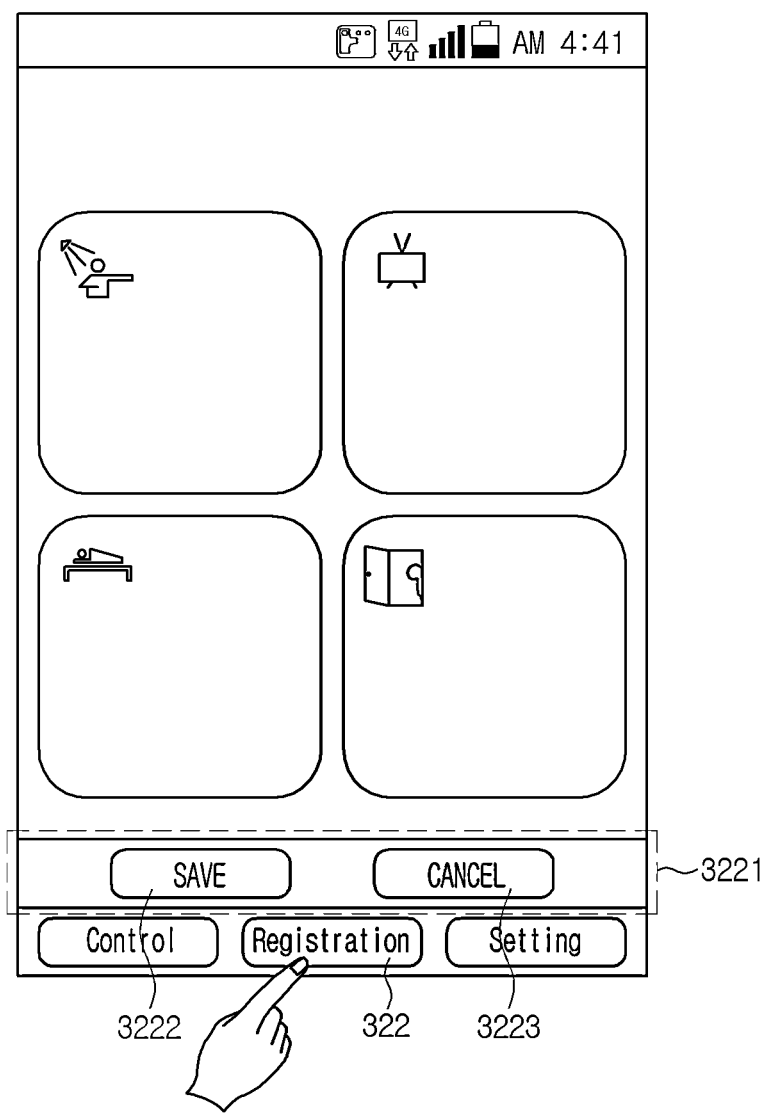
FIGS. 19 to 24 are views for explaining a registration process of a lighting device according to the embodiment.

Referring to FIG. 19, if the registration menu 322 is selected from the starting screen described above, the registration process for the unregistered lighting devices may be performed.

In this case, if the registration menu 322 is selected, the save menu 3222 for registering and storing the lighting devices and the cancel menu 3223 for canceling the registration may be displayed in a specific region 3221 of the graphic user interface.

In addition, as the registration menu 322 is selected, the lighting control device may search for the unregistered lighting devices from among the lighting devices located around the lighting control device.

Figure 20:
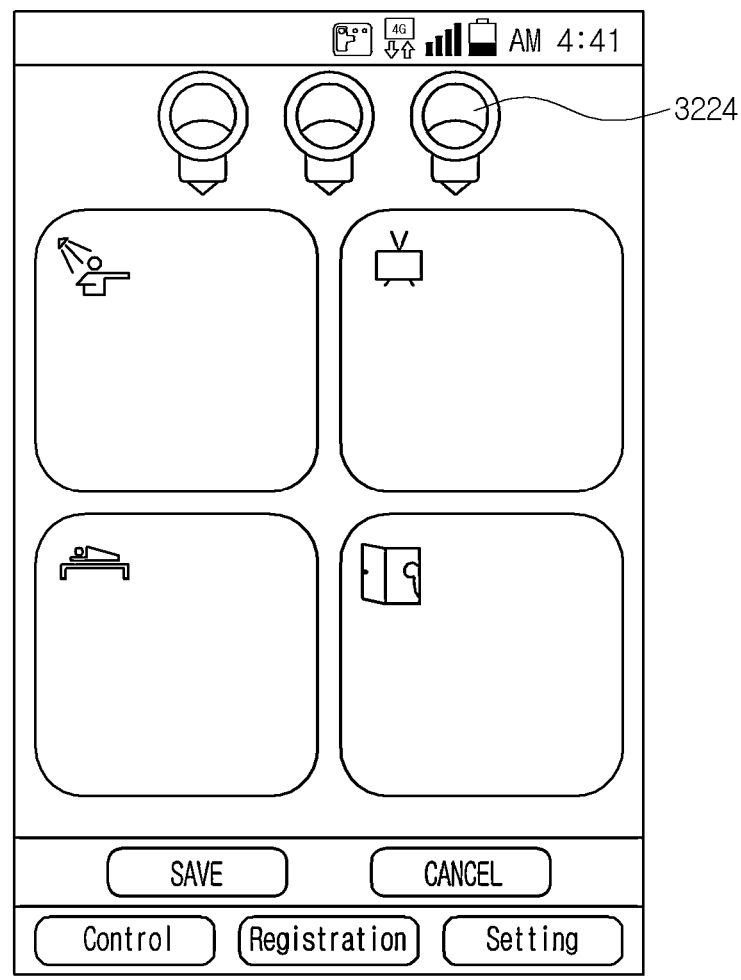

Further, referring to FIG. 20, if the lighting devices are detected during the search process, the candidate icons 3224 corresponding to the detected lighting devices may be displayed in the specific region of the graphic user interface. The number of the candidate icons 3224 may correspond to the number of detected lighting devices.

At this time, the candidate icons 3224 may be displayed in the sequence of the RSSI value of the response signal to the search signal.

In addition, if one specific candidate icon is selected from among the candidate icons, the size of the specific candidate icon may be changed to notify the selection of the specific candidate icon.

Figure 21:
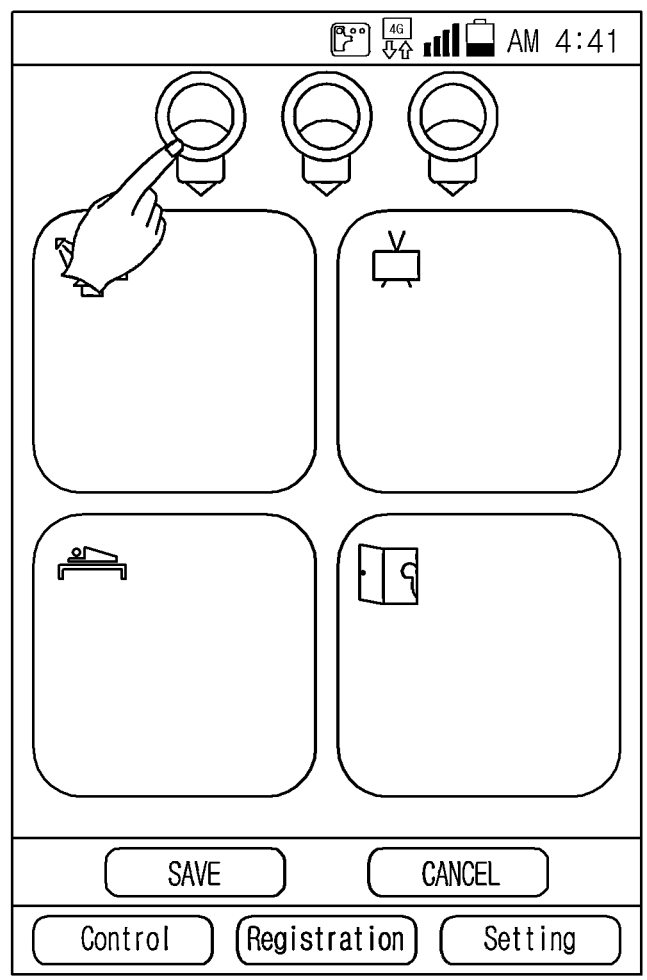

After that, referring to FIG. 21, as the specific candidate icon is selected, the lighting device corresponding to the specific candidate icon may perform the register dimming operation.

The register dimming operation is for notifying the position of the lighting device corresponding to the selected specific candidate icon. The register dimming operation may be a flickering operation of a light source included in the corresponding light source.

Therefore, the user can recognize, with the naked eyes, the position of the lighting device corresponding to the specific candidate icon to be registered.

Meanwhile, the map divided into a plurality of lighting devices as described above may be displayed in the first region of the graphic user interface.

Figure 22:
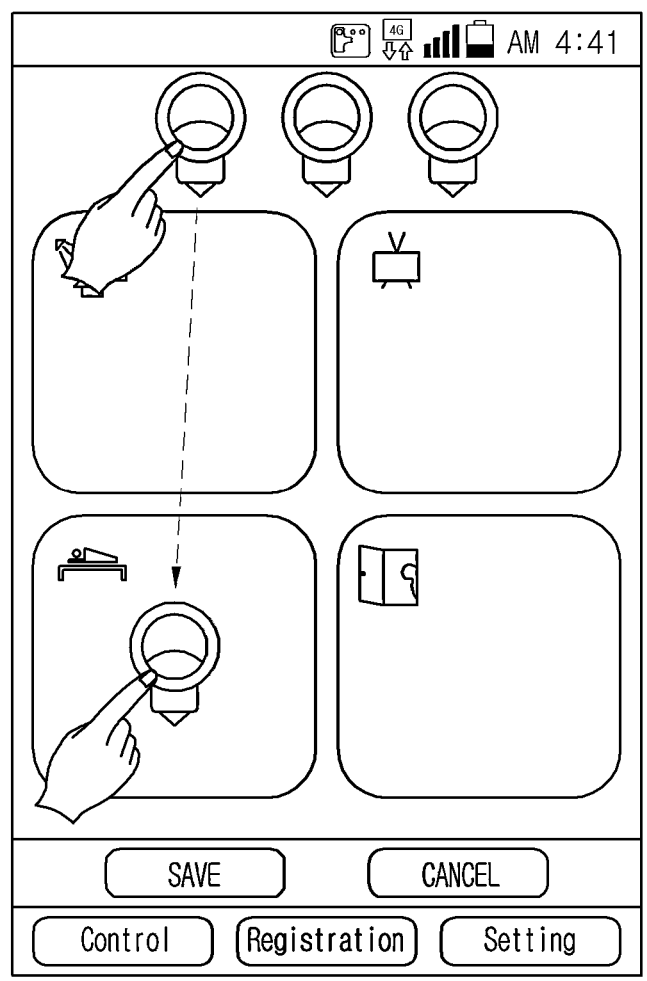

In addition, referring to FIG. 22, the specific candidate icon may be dragged to one of the division spaces while holding the touch to the specific candidate icon.

At this time, the drag operation may be targeted to the division space corresponding to the actual position of the lighting device to be registered.

Figure 23:
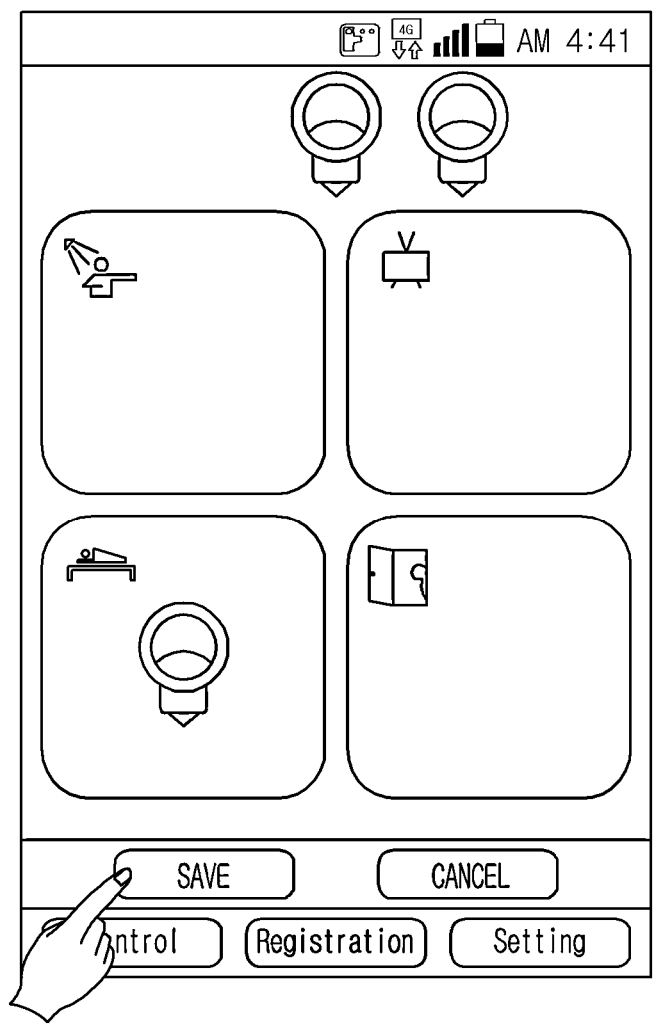
Figure 24:
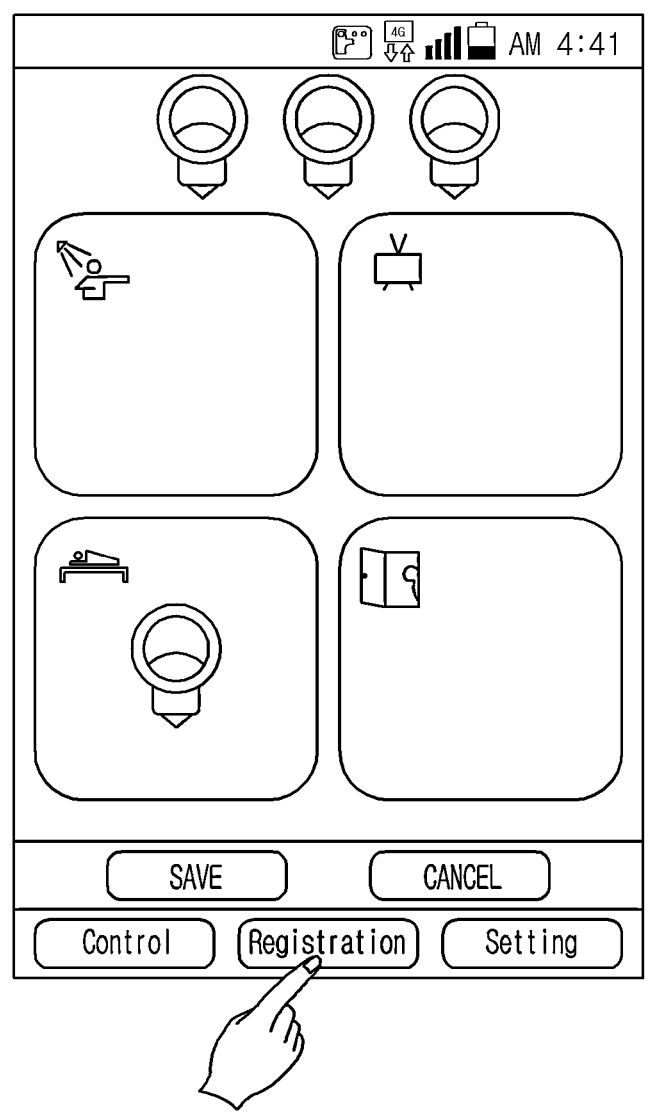

After that, referring to FIG. 23, if the touch to the specific candidate icon is released after the drag operation, the specific candidate icon may be located at the dragged position. Thus, the register dimming operation for the lighting device corresponding to the specific candidate icon may be finished.

In addition, as the save menu of the graphic user interface is selected, the registration for the lighting device corresponding to the specific candidate icon may be completed.

In contrast, if the cancel menu is selected, the specific candidate icon may return to the original position from the dragged division space.

After that, the lighting control device selects again the registration menu 322 to register another lighting device other than the lighting device corresponding to the specific candidate icon and searches again for the lighting devices corresponding to the candidate icons.

Figure 25:
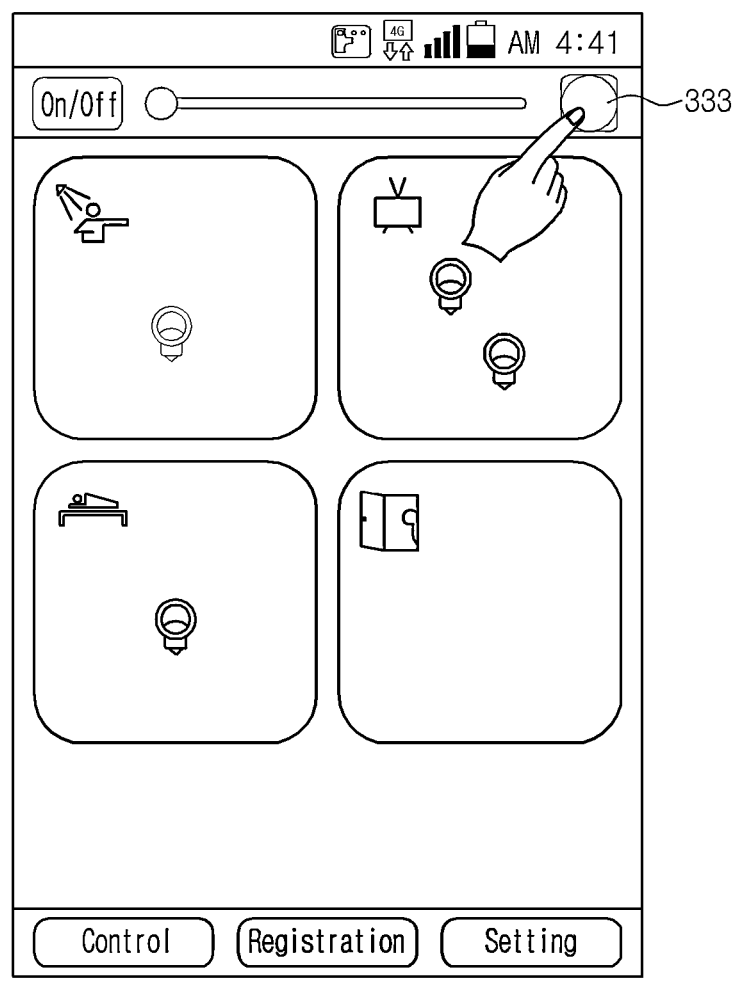
FIGS. 25 and 26 are views showing graphic user interfaces for a group control of lighting devices according to the embodiment.
Figure 26:
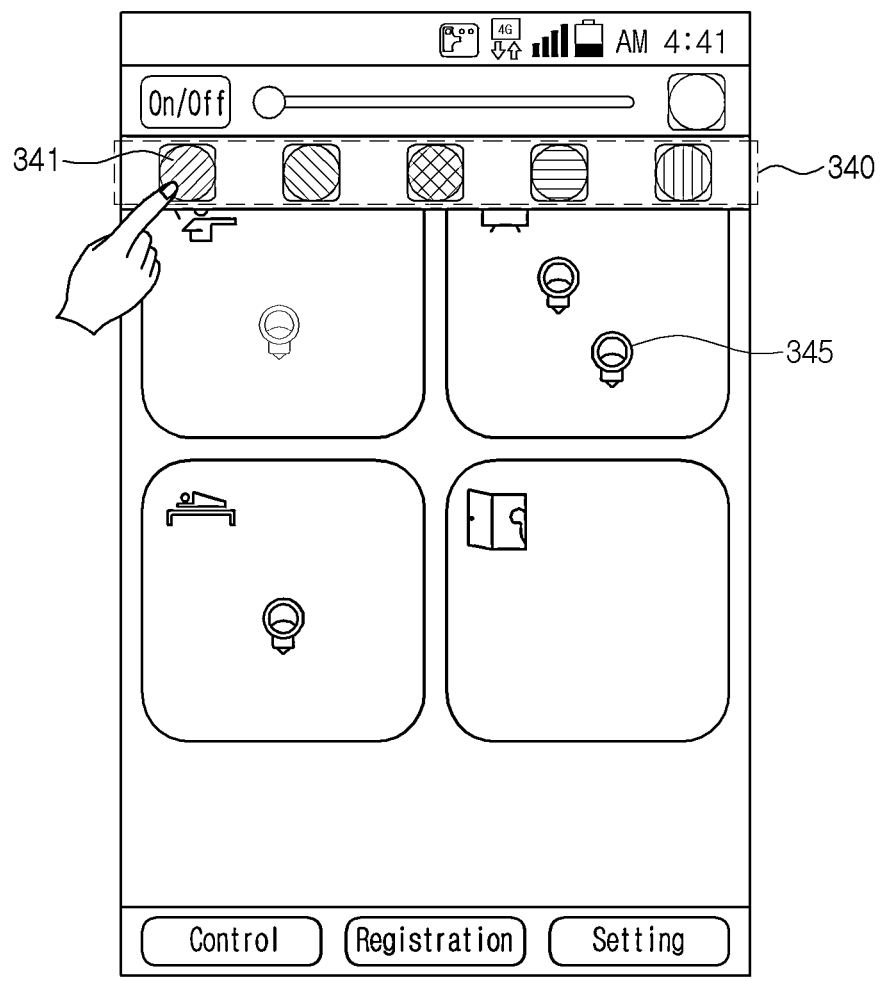

FIGS. 25 and 26 are views showing graphic user interfaces for the group control of the lighting devices according to the embodiment.

Referring to FIG. 25, a third menu 333 for selecting one specific group from among the plural groups may be displayed in the third region 330 of the graphic user interface.

If the third menu 333 is selected, as shown in FIG. 26, a group selection screen 340 for selecting one specific group from among the plural groups may be displayed in one region of the graphic user interface.

Symbol icons 341 for the plural groups may be displayed in the group selection screen 340.

The symbol icons 341 may stand for the plural groups and may be used to select the plural groups, respectively.

If one specific symbol icon is selected from among the symbol icons 341, a group corresponding to the selected symbol icon may be selected.

At this time, among the lighting icons displayed in the first region of the graphic user interface, the display status of the lighting icons included in the selected group, such as the size or the color, may be changed so that the lighting icons corresponding to the selected group may be distinguished from other lighting icons.

After that, the power on-off operation or the brightness control of the lighting devices corresponding to the selected group can be collectively performed by using one of the first menu 331 and the second menu 332 included in the graphic user interface.

As described above, according to the embodiment, the application for lighting control is installed in the lighting control device, and the map is applied for the installation space of the lighting device to register the plural lighting devices based on the map and to control the operation state of the lighting devices, so that the lighting control can be achieved in real time at the corresponding position according to position variation.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lighting system comprising:
   a lighting device; and
   a graphic user interface displayed on a touch screen of a lighting control device to control the lighting device, wherein the graphic user interface comprises:
a first region to display a map for an installation space of the lighting device and a lighting icon corresponding to the lighting device in the map, and
a second region to display a menu for setting a control condition of the lighting device corresponding to the lighting icon, and
wherein the map comprises a plurality of division spaces obtained by dividing the installation space into a plurality of regions and the lighting icon is displayed in a specific division space corresponding to an actual installation portion of the lighting device;
wherein the lighting icon comprises:
a first type lighting icon to represent the lighting device under on-state, and
a second type lighting icon to represent the lighting device under off-state;
wherein the graphic user interface further comprises a third region to display a menu for changing an operation state of the lighting device corresponding to a second-selected lighting icon as a specific lighting icon is second-selected from among lighting icons displayed in the first region, and
wherein the menu displayed in the third region comprises:
a first menu to change a state of a power source of the lighting device corresponding to the second-selected lighting icon, and
a second menu to change a brightness of the lighting device corresponding to the second-selected lighting icon.

2. The lighting system of claim 1, wherein the lighting icon further comprises a third type lighting icon to represent the lighting device under off-state of communication linkage to the lighting control device.

3. The lighting system of claim 1, wherein, when a first type specific lighting icon is first-selected from among lighting icons displayed in the first region, the first-selected first type specific icon is changed into a second type lighting icon, and
when a second type specific lighting icon is first-selected from among the lighting icons displayed in the first region, the first-selected second type specific icon is changed into the first lighting icon.

4. The lighting system of claim 1, wherein the menu displayed in the third region further comprises a third menu to select a group control,
the graphic user interface further displays a group selection menu to select one specific group from among a plurality of groups as the third menu is selected, and
the group control is used to collectively control a plurality of lighting devices which are grouped as one same group.

5. The lighting system of claim 1, wherein the menu displayed in the second region comprises at least one of a load menu to select a type of the map displayed in the first region, an auto-control menu to automatically control the lighting device according to a distance between the lighting device and the lighting control device, a group menu to collect a plurality of lighting icons corresponding to a plurality of lighting device as one group, a general menu to set a display type of an icon displayed in the graphic user interface and a help menu to display a help.

6. The lighting system of claim 1, wherein the menu displayed in the second region comprises a registration menu to register unregistered lighting devices from among lighting devices located around the lighting control device.

7. The lighting system of claim 6, wherein the lighting control device searches for the unregistered lighting devices from among the lighting devices located around the lighting control device when the registration menu is selected, and
a candidate icon is displayed in the graphic user interface to register the unregistered lighting devices according to a search result of the lighting control device.

8. The lighting system of claim 7, wherein the candidate icon is shifted to a specific division space of a plurality of division spaces displayed in the first region, which corresponds to an actual installation position of a corresponding lighting device, according to selection of a user, and
the lighting device corresponding to a selected candidate icon performs a register dimming operation as the candidate icon is selected.

9. A method of controlling a lighting device, the method comprising:
executing an application to control the lighting device;
displaying a graphic user interface on a touch screen of a lighting control device as the application is executed; and
controlling the lighting device by using the displayed graphic user interface,
wherein the graphic user interface comprises:
a first region to display a map for an installation space of the lighting device and a lighting icon corresponding to the lighting device in the map, and
a second region to display a menu for setting a control condition of the lighting device corresponding to the lighting icon;
wherein the map comprises a plurality of division spaces obtained by dividing the installation space into a plurality of regions and the lighting icon is displayed in a specific division space corresponding to an actual installation portion of the lighting device;
wherein the graphic user interface further comprises a third region to display a menu for changing an operation state of the lighting device corresponding to a second-selected lighting icon as a specific lighting icon is second-selected from among lighting icons displayed in the first region; and
wherein the menu displayed in the third region comprises:
a first menu to change a state of a power source of the lighting device corresponding to the second-selected lighting icon, and
a second menu to change a brightness of the lighting device corresponding to the second-selected lighting icon.

10. The method of claim 9, wherein the lighting icon comprises:
a first type lighting icon to represent the lighting device under on-state; and
a second type lighting icon to represent the lighting device under off-state.

11. The method of claim 10, wherein the lighting icon further comprises a third type lighting icon to represent the lighting device under off-state of communication linkage to the lighting control device.

12. The method of claim 10, wherein, when a first type specific lighting icon is first-selected from among lighting icons displayed in the first region, the first-selected first type specific icon is changed into a second type lighting icon, and
when a second type specific lighting icon is first-selected from among the lighting icons displayed in the first region, the first-selected second type specific icon is changed into the first lighting icon.

13. The method of claim 9, wherein the menu displayed in the third region further comprises a third menu to select a group control, the graphic user interface further displays a group selection menu to select one specific group from among a plurality of groups as the third menu is selected, and the group control is used collectively control a plurality of lighting devices which are grouped as one same group.

14. The method of claim 9, wherein the menu displayed in the second region comprises at least one of a load menu to select a type of the map displayed in the first region, an auto-control menu to automatically control the lighting device according to a distance between the lighting device and the lighting control device, a group menu to collect a plurality of lighting icons corresponding to a plurality of lighting device as one group, a general menu to set a display type of an icon displayed in the graphic user interface and a help menu to display a help.

15. The method of claim 9, wherein the menu displayed in the second region comprises a registration menu to register unregistered lighting devices from among lighting devices located around the lighting control device.

16. The method of claim 15, wherein the lighting control device searches for the unregistered lighting devices from among the lighting devices located around the lighting control device when the registration menu is selected, and a candidate icon is displayed in the graphic user interface to register the unregistered lighting devices according to a search result of the lighting control device.

17. The method of claim 16, wherein the candidate icon is shifted to a specific division space of a plurality of division spaces displayed in the first region, which corresponds to an actual installation position of a corresponding lighting device, according to selection of a user, and the lighting device corresponding to a selected candidate icon performs a register dimming operation as the candidate icon is selected.

\* \* \* \* \*